(12) United States Patent
Golden et al.

(10) Patent No.: US 9,218,407 B1
(45) Date of Patent: Dec. 22, 2015

(54) REPLICATION AND INTERMEDIATE READ-WRITE STATE FOR MEDIUMS

(71) Applicant: PURE Storage, Inc., Mountain View, CA (US)

(72) Inventors: Christopher Golden, Mountain View, CA (US); Jianting Cao, Mountain View, CA (US); David Grunwald, San Francisco, CA (US); Malcolm Sharpe, Mountain View, CA (US); Steve Hodgson, Mountain View, CA (US)

(73) Assignee: Pure Storage, Inc., Mountain View, CA (US)

( * ) Notice: Subject to any disclaimer, the term of this patent is extended or adjusted under 35 U.S.C. 154(b) by 0 days.

(21) Appl. No.: 14/314,879

(22) Filed: Jun. 25, 2014

(51) Int. Cl.
*G06F 17/30* (2006.01)
*G06F 3/06* (2006.01)

(52) U.S. Cl.
CPC .......... *G06F 17/30575* (2013.01); *G06F 3/065* (2013.01); *G06F 3/067* (2013.01); *G06F 3/0647* (2013.01); *G06F 3/0683* (2013.01); *G06F 3/0689* (2013.01)

(58) Field of Classification Search
CPC ..... G06F 3/065; G06F 3/0689; G06F 3/0683; G06F 17/30575; G06F 3/0647; G06F 3/067
USPC ....................................................... 707/634
See application file for complete search history.

(56) References Cited

U.S. PATENT DOCUMENTS

| | | | |
|---|---|---|---|
| 4,467,421 A | 8/1984 | White | |
| 5,247,638 A | 9/1993 | O'Brien et al. | |
| 5,890,154 A | 3/1999 | Hsiao et al. | |
| 5,926,819 A | 7/1999 | Doo et al. | |
| 5,991,542 A | 11/1999 | Han et al. | |
| 5,996,022 A | 11/1999 | Krueger et al. | |
| 6,049,809 A | 4/2000 | Raman et al. | |
| 6,125,393 A | 9/2000 | Clark et al. | |
| RE36,989 E | 12/2000 | White | |
| 6,301,589 B1 | 10/2001 | Hirashima et al. | |
| 6,308,222 B1 | 10/2001 | Krueger et al. | |
| 6,473,776 B2 | 10/2002 | Ieong et al. | |
| 6,496,868 B2 | 12/2002 | Krueger et al. | |
| 6,820,098 B1 | 11/2004 | Ganesh et al. | |
| 6,976,026 B1 | 12/2005 | Getzinger et al. | |
| 7,076,508 B2 | 7/2006 | Bourbonnais et al. | |
| 7,082,446 B1 | 7/2006 | Bottomley | |
| 7,099,514 B2 | 8/2006 | Getzinger et al. | |

(Continued)

OTHER PUBLICATIONS

"How to Perform a True Image Restore", Symantec.com, Nov. 15, 2004; http://seer.entsupport.symantec.com/docs/267780.html., 5 pages.

(Continued)

*Primary Examiner* — Rehana Perveen
*Assistant Examiner* — Tiffany Thuy Bui
(74) *Attorney, Agent, or Firm* — Edward J. Lenart; Kennedy Lenart Spraggins LLP

(57) ABSTRACT

A system and method for exposing volumes with underlying read-write mediums to user operations. When a medium is in the process of being replicated to a storage array, a volume which relies on the medium can be exposed to user operations (e.g., snapshots, read and write operations) once the portions of the medium which underlie the volume have been replicated. The volume can be exposed to user operations while one or more other portions of the medium are unfilled and while the medium is in an intermediate read-write state.

17 Claims, 7 Drawing Sheets

(56) References Cited

U.S. PATENT DOCUMENTS

| | | | |
|---|---|---|---|
| 7,191,284 B1 | 3/2007 | Gupta et al. | |
| 7,240,060 B2 | 7/2007 | Adya et al. | |
| 7,296,237 B2 | 11/2007 | Crocker et al. | |
| 7,308,545 B1 | 12/2007 | Kekre et al. | |
| 7,320,088 B1 | 1/2008 | Gawali | |
| 7,389,309 B2 | 6/2008 | Edelstein et al. | |
| 7,454,424 B2 | 11/2008 | Cherkasova | |
| 7,546,364 B2* | 6/2009 | Raman et al. | 709/226 |
| 7,558,801 B2 | 7/2009 | Getzinger et al. | |
| 8,019,727 B2 | 9/2011 | Tomic et al. | |
| 8,055,745 B2 | 11/2011 | Atluri | |
| 8,140,603 B2 | 3/2012 | Getzinger et al. | |
| 8,285,956 B2 | 10/2012 | Ozdemir | |
| 8,370,404 B2 | 2/2013 | Getzinger et al. | |
| 8,438,136 B2 | 5/2013 | Ohr et al. | |
| 2001/0014123 A1 | 8/2001 | Strasman et al. | |
| 2002/0091710 A1 | 7/2002 | Dunham et al. | |
| 2002/0174139 A1 | 11/2002 | Midgley et al. | |
| 2003/0120751 A1 | 6/2003 | Husain et al. | |
| 2003/0154199 A1 | 8/2003 | Thomas et al. | |
| 2004/0024961 A1* | 2/2004 | Cochran et al. | 711/112 |
| 2004/0098717 A1 | 5/2004 | Husain et al. | |
| 2004/0117584 A1 | 6/2004 | Banerjee et al. | |
| 2004/0260873 A1* | 12/2004 | Watanabe | 711/114 |
| 2005/0147310 A1 | 7/2005 | Getzinger et al. | |
| 2005/0172005 A1* | 8/2005 | Goodwin | 709/211 |
| 2005/0216428 A1 | 9/2005 | Yagawa | |
| 2005/0226514 A1 | 10/2005 | Getzinger et al. | |
| 2006/0143507 A1* | 6/2006 | Tanaka | 714/6 |
| 2006/0242182 A1 | 10/2006 | Palaniappan et al. | |
| 2006/0271601 A1 | 11/2006 | Fatula, Jr. et al. | |
| 2007/0043726 A1 | 2/2007 | Chan et al. | |
| 2007/0162516 A1 | 7/2007 | Thiel et al. | |
| 2007/0185973 A1 | 8/2007 | Wayda et al. | |
| 2008/0162523 A1 | 7/2008 | Kraus et al. | |
| 2008/0243860 A1 | 10/2008 | Cannon et al. | |
| 2008/0320261 A1* | 12/2008 | Colgrove et al. | 711/162 |
| 2009/0238475 A1 | 9/2009 | Getzinger et al. | |
| 2010/0250880 A1 | 9/2010 | Mimatsu | |
| 2010/0306174 A1* | 12/2010 | Otani | 707/640 |
| 2011/0119228 A1 | 5/2011 | Menze et al. | |
| 2011/0313971 A1* | 12/2011 | Hironaga et al. | 707/610 |
| 2012/0047115 A1 | 2/2012 | Subramanya et al. | |
| 2012/0134600 A1 | 5/2012 | Getzinger et al. | |
| 2012/0150949 A1* | 6/2012 | Vijayan Retnamma et al. | 709/203 |
| 2012/0271868 A1 | 10/2012 | Fukatani et al. | |
| 2013/0159645 A1 | 6/2013 | Anglin et al. | |
| 2013/0332700 A1* | 12/2013 | Kopylovitz et al. | 711/209 |
| 2014/0195762 A1* | 7/2014 | Colgrove et al. | 711/166 |

OTHER PUBLICATIONS

Shyam, et al., U.S. Appl. No. 13/478,309, entitled "Efficient File Replication Which Preserves the Underlying Extent Structure", filed May 23, 2012, 79 pages.

* cited by examiner

REPLICATION AND INTERMEDIATE READ-WRITE STATE FOR MEDIUMS

BACKGROUND OF THE INVENTION

1. Technical Field

Embodiments described herein relate to replication and mediums, and more particularly, to techniques for exposing volumes to user operations, wherein the volumes rely on partially replicated mediums.

2. Description of the Related Art

Businesses and organizations require comprehensive data storage solutions for facilitating the storage of increasing amounts of data while making the data continuously available. The importance of data to a company's operations necessitates that the data be backed up to protect against corruption or loss. Many techniques can be utilized to protect the data and ensure that the data is continuously available. One of these techniques is replication.

Replication is the process of copying data from an original or source storage system to a replica storage system for data protection or disaster recovery purposes. In some cases, replication may be used to copy a user volume to a replica system within a separate failure domain from the original system. A user volume may include data in portions of a plurality of mediums which underlie the user volume. One way of performing replication is to send each of these mediums in its entirety from the original system to the replica system. However, this approach is inefficient and may consume significant resources.

In view of the above, improved techniques for performing replication are desired.

SUMMARY OF THE INVENTION

Various embodiments of systems and methods for performing replication using an intermediate read-write state for mediums are contemplated.

In one embodiment, a storage array may include a storage controller and one or more storage devices, and the storage array may be coupled to one or more other storage arrays. In one embodiment, the storage controller may utilize volumes and mediums to track stored client data. A medium may be defined as an identifiable logical collection of data.

In one embodiment, a replica storage array may be coupled to an original storage array. The original storage array may store a plurality of volumes and a plurality of mediums corresponding to these volumes. In various embodiments, one or more volume(s) may be selected for replication when the replica storage array connects to the original storage array. For example, a first volume may be selected for replication from the original storage array to the replica storage array. The first volume may have an underlying anchor medium generally representing a logical collection of data, and the anchor medium may be mapped to any number of underlying mediums including a first portion of a first medium.

The first portion of the first medium may be replicated from the original storage array to the replica storage array, and prior to the entirety of the first medium being replicated, the first volume may be exposed to user operations. In one embodiment, the first medium may be in an intermediate read-write state while the first volume is exposed to user operations (e.g., write operations, read operations, snapshots). Until all the remaining portions of the first medium are replicated, the first medium may remain in the intermediate read-write state on the replica storage array. Then, after the first volume has been exposed to the user, the remaining portions of the first medium may be filled in on the replica storage array. After the entirety of the first medium has been replicated to the replica storage array, the first medium may be put in a read-only state.

These and other embodiments will become apparent upon consideration of the following description and accompanying drawings.

Figure 1:
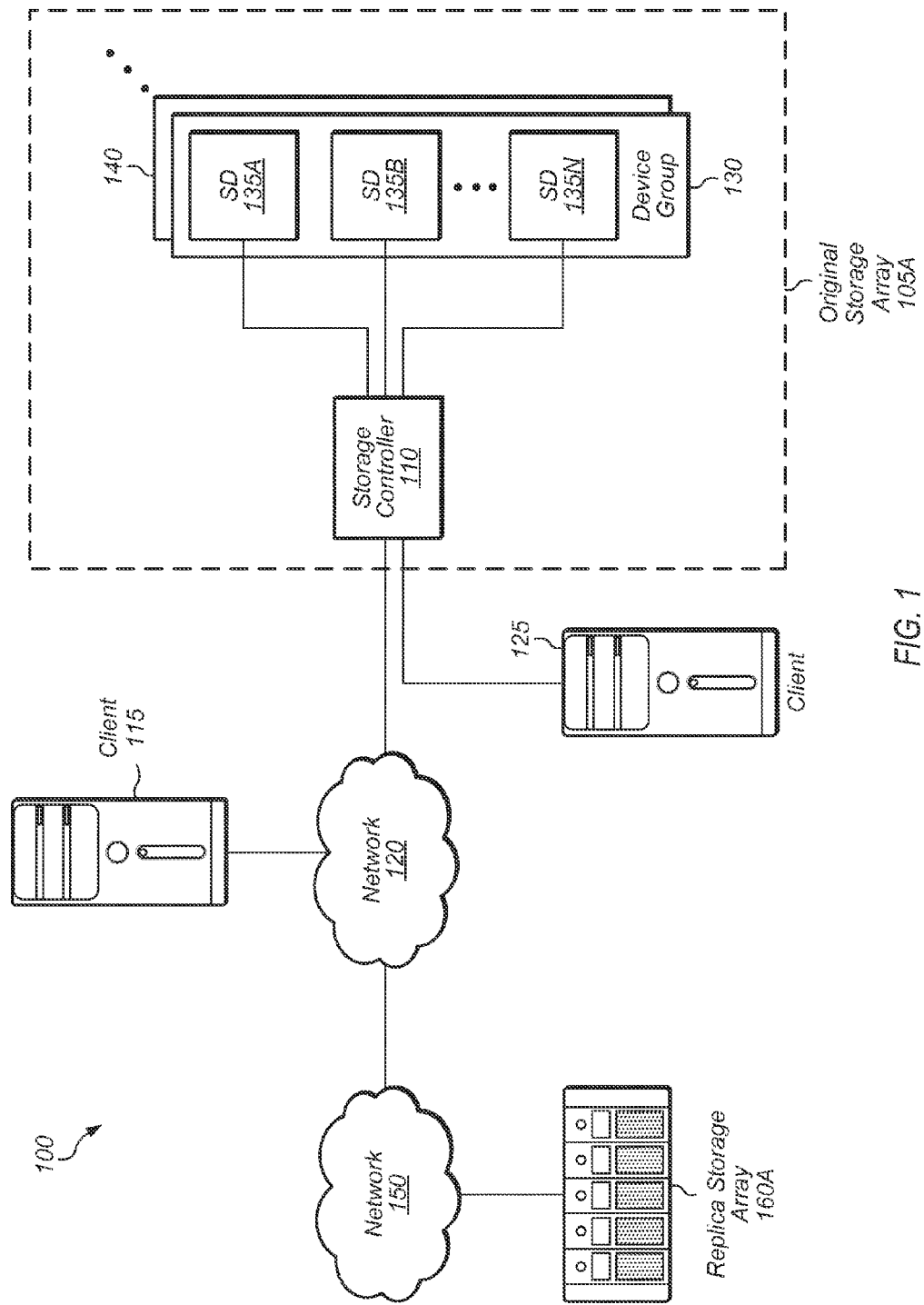
FIG. 1 is a generalized block diagram illustrating one embodiment of a storage system.

While the methods and mechanisms described herein are susceptible to various modifications and alternative forms, specific embodiments are shown by way of example in the drawings and are herein described in detail. It should be understood, however, that drawings and detailed description thereto are not intended to limit the methods and mechanisms to the particular form disclosed, but on the contrary, are intended to cover all modifications, equivalents and alternatives apparent to those skilled in the art once the disclosure is fully appreciated.

DETAILED DESCRIPTION

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a first storage array . . . " Such a claim does not foreclose the system from including additional components (e.g., a network, a server, a display device).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, paragraph (f), for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a generalized block diagram of one embodiment of a storage system 100 is shown. Storage system 100 may include original storage array 105A and replica storage array 160A. Original storage array 105A may include storage controller 110 and storage device groups 130 and 140, which are representative of any number of storage device groups. Although not shown in FIG. 1, replica storage array 160A may also include a storage controller and one or more storage device groups.

As shown, storage device group 130 includes storage devices 135A-N, which are representative of any number and type of storage devices (e.g., solid-state drives (SSDs)). Storage controller 110 may be coupled directly to client computer system 125, and storage controller 110 may be coupled remotely over network 120 to client computer system 115. Clients 115 and 125 are representative of any number of clients which may utilize storage controller 110 for storing and accessing data in system 100. It is noted that some systems may include only a single client, connected directly or remotely to storage controller 110. It is also noted that original storage array 105A may include more than one storage controller in some embodiments.

Storage controller 110 may include software and/or hardware configured to provide access to storage devices 135A-N. Although storage controller 110 is shown as being separate from storage device groups 130 and 140, in some embodiments, storage controller 110 may be located within one or each of storage device groups 130 and 140. Storage controller 110 may include or be coupled to a base operating system (OS), a volume manager, and additional control logic for implementing the various techniques disclosed herein.

Storage controller 110 may include and/or execute on any number of processors and may include and/or execute on a single host computing device or be spread across multiple host computing devices, depending on the embodiment. In some embodiments, storage controller 110 may generally include or execute on one or more file servers and/or block servers. Storage controller 110 may use any of various techniques for replicating data across devices 135A-N to prevent loss of data due to the failure of a device or the failure of storage locations within a device. Storage controller 110 may also utilize any of various fine-grained deduplication techniques for reducing the amount of data stored in devices 135A-N by deduplicating common data segments.

Storage controller 110 may also be configured to create and manage mediums in system 100. Accordingly, a set of mediums may be recorded and maintained by storage controller 110. A medium may be defined as an identifiable logical collection of data. A medium may be virtual such that it is identified by a unique ID, and all blocks stored to a volume while the corresponding medium is open for writing are recorded as <medium, block number>. Each medium logically comprises all of the blocks in the medium. However, only the blocks that were written to the medium from the time the medium was created to the time the medium was closed are recorded and mappings to these blocks may also be maintained with the medium.

The term "medium" is not to be confused with the terms "storage medium" or "computer readable storage medium". A storage medium is defined as an actual physical device (e.g., SSD, HDD) that is utilized to store data. A computer readable storage medium (or non-transitory computer readable storage medium) is defined as a physical storage medium configured to store program instructions which are executable by a processor or other hardware device. Various types of program instructions that implement the methods and/or mechanisms described herein may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In system 100, volumes, snapshots, and/or mediums may be replicated from original storage array 105A to replica storage array 160A. For example, replica storage array 160A may decide which particular snapshots to replicate when replica storage array 160A connects to original storage array 105A. Alternatively, original storage array 105A may make a policy decision and inform replica storage array 160A to pull a particular snapshot. Replica storage array 160A may then choose to pull the medium corresponding to the particular snapshot from original storage array 105A or any other storage array (not shown) it has access to. Original storage array 105A may utilize a variety of techniques to minimize the amount of data sent to replica storage array 160A for a given snapshot.

In one embodiment, a first volume may be replicated from original storage array 105A to replica storage array 160A. The replication may be performed in a medium aware way such that only the portions of the underlying mediums may be replicated which are necessary to expose the first volume on the replica storage array 160A. The first volume may be exposed to user operations while one or more underlying mediums have not been fully replicated and are still in an intermediate read-write state. While a given medium is in the intermediate read-write state, the replication process may write to the given medium but the given medium may be considered stable and unchanging from the perspective of user operations. Later replication operations for other volumes may replicate other portions of the given medium to the replica storage array 160A.

In various embodiments, multiple mapping tables may be maintained by storage controller 110. These mapping tables may include a medium mapping table, a volume-to-medium mapping table, an address translation table, a deduplication table, an overlay table, and/or other tables. In some embodiments, the information stored in two or more of these tables may be combined into a single table. The medium mapping table may be utilized to record and maintain the mappings between mediums and underlying mediums and the volume-to-medium mapping table may be utilized to record and maintain the mappings between volumes and anchor mediums. In one embodiment, a volume may be mapped to an anchor medium which is in a read-write state. The anchor medium may then be mapped to any number of underlying mediums (or portions of mediums) in the medium mapping table.

The address translation table may include a plurality of entries, with each entry holding a virtual-to-physical mapping for a corresponding data component. This mapping table may be used to map logical read/write requests from each of the client computer systems 115 and 125 to physical locations in storage devices 135A-N. A "physical" pointer value may be read from the mappings associated with a given medium or snapshot during a lookup operation corresponding to a received read/write request. This physical pointer value may then be used to locate a physical location within the storage devices 135A-N. It is noted that the physical pointer value may be used to access another mapping table within a given storage device of the storage devices 135A-N. Consequently, one or more levels of indirection may exist between the physical pointer value and a target storage location.

In various embodiments, the address translation table may be accessed using a key comprising a medium or snapshot ID, a logical or virtual address, a sector number, and so forth. A received read/write storage access request may identify a particular volume, sector, and length. The volume ID may be mapped to a medium or snapshot ID using the volume to medium mapping table. A sector may be a logical block of data stored in a medium. Sectors may have different sizes on different mediums. The address translation table may map a medium in sector-size units. In one embodiment, the key value for accessing the address translation table may be the combination of the medium ID and the received sector number. A key is an entity in a mapping table that distinguishes one row of data from another row. In other embodiments, other types of address translation tables may be utilized.

In one embodiment, the address translation table may map mediums and block offsets to physical pointer values. Depending on the embodiment, a physical pointer value may be a physical address or a logical address which the storage device maps to a physical location within the device. In one embodiment, an index may be utilized to access the address translation table. The index may identify locations of mappings within the address translation table. The index may be queried with a key value generated from a medium ID and sector number, and the index may be searched for one or more entries which match, or otherwise correspond to, the key value. Information from a matching entry may then be used to locate and retrieve a mapping which identifies a storage location which is the target of a received read or write request. In one embodiment, a hit in the index provides a corresponding virtual page ID identifying a page within the storage devices of the storage system, with the page storing both the key value and a corresponding physical pointer value. The page may then be searched with the key value to find the physical pointer value.

The deduplication table may include information used to deduplicate data at a fine-grained level. The information stored in the deduplication table may include mappings between one or more calculated hash values for a given data component and a physical pointer to a physical location in one of the storage devices 135A-N holding the given data component. In addition, a length of the given data component and status information for a corresponding entry may be stored in the deduplication table. It is noted that in some embodiments, one or more levels of indirection may exist between the physical pointer value and the corresponding physical storage location. Accordingly, in these embodiments, the physical pointer may be used to access another mapping table within a given storage device of the storage devices 135A-N.

Networks 120 and 150 may utilize a variety of techniques including wireless connection, direct local area network (LAN) connections, wide area network (WAN) connections such as the Internet, a router, storage area network, Ethernet, and others. Networks 120 and 150 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in networks 120 and 150. The networks 120 and 150 may interface with a set of communications protocols used for the Internet such as the Transmission Control Protocol (TCP) and the Internet Protocol (IP), or TCP/IP.

Client computer systems 115 and 125 are representative of any number of stationary or mobile computers such as desktop personal computers (PCs), servers, server farms, workstations, laptops, handheld computers, servers, personal digital assistants (PDAs), smart phones, and so forth. Generally speaking, client computer systems 115 and 125 include one or more processors comprising one or more processor cores. Each processor core includes circuitry for executing instructions according to a predefined general-purpose instruction set. For example, the x86 instruction set architecture may be selected. Alternatively, the ARM®, Alpha®, PowerPC®, SPARC®, or any other general-purpose instruction set architecture may be selected. The processor cores may access cache memory subsystems for data and computer program instructions. The cache subsystems may be coupled to a memory hierarchy comprising random access memory (RAM) and a storage device.

It is noted that in alternative embodiments, the number and type of client computers, storage controllers, networks, storage device groups, and data storage devices is not limited to those shown in FIG. 1. At various times one or more clients may operate offline. In addition, during operation, individual client computer connection types may change as users connect, disconnect, and reconnect to system 100. Further, the systems and methods described herein may be applied to directly attached storage systems or network attached storage systems and may include a host operating system configured to perform one or more aspects of the described methods. Numerous such alternatives are possible and are contemplated.

Figure 2:
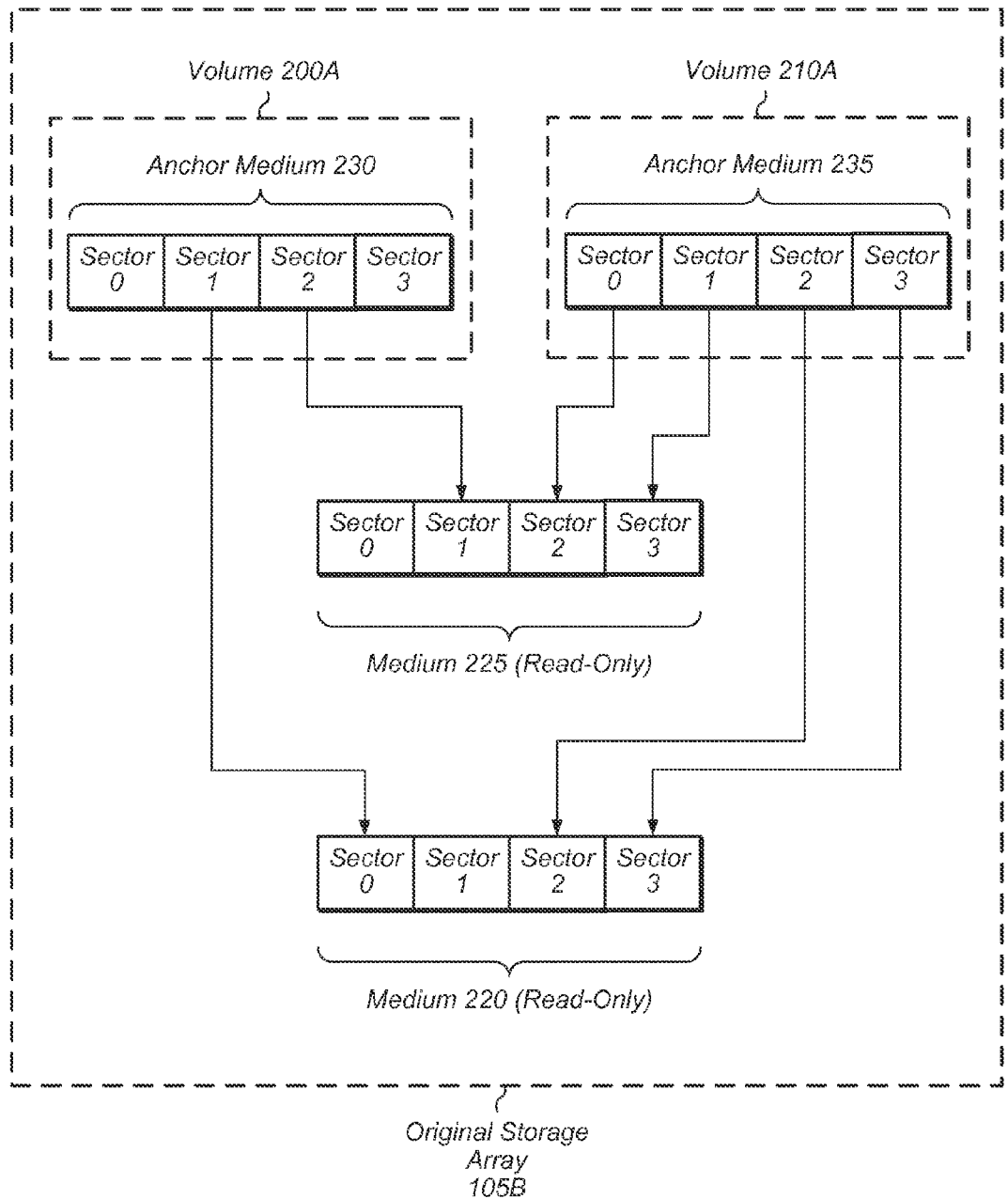
FIG. 2 is a block diagram of one embodiment of two volumes with underlying mediums.

Turning now to FIG. 2, a block diagram of one embodiment of two volumes with underlying mediums are shown. The example volumes 200A and 210A shown and described in FIG. 2 are intended to illustrate an example of how content may be spread among multiple mediums. It is to be understood that this is merely one example and other embodiments may have other sizes of volumes with other numbers of sectors and other numbers of underlying mediums. For example, volumes and mediums are shown as including four sectors, but this is shown for ease of illustration, and it should be understood that volumes and mediums may have any number and size of sectors depending on the embodiment. Volumes 200A and 210A are shown as being stored on original storage array 105B, which is intended to represent original storage array 105A (of FIG. 1) at a given point in time. Original storage array 105B may also include any number of other volumes and other data which are not shown to avoid obscuring the figure.

Volume 200A has an anchor medium ID 230, while volume 210A has an anchor medium ID 235. Mediums 220 and 225 are in the read-only, stable state on the original storage system 105B. In other words, the contents of mediums 220 and 225 are stable, such that a look-up of either of mediums 220 and 225 will not change. For anchor medium 230, sectors 0 and 3 include new content, and these sectors may include their own mappings to the corresponding data rather than relying on underlying mediums for these mappings. Also for anchor medium 230, sector 1 maps to sector 0 of read-only medium 220 and sector 2 maps to sector 1 of read-only medium 225, which indicates that these sectors of volume 200A have not changed since mediums 220 and 225 were created. The arrows shown in FIG. 2 between anchor mediums and mediums are intended to represent mappings between sectors of the anchor mediums and the corresponding sectors of the mediums. For anchor medium 235 (of volume 210A), sectors 0 and 1 map to sectors 2 and 3, respectively, of read-only medium 225 and sectors 2 and 3 map to sectors 2 and 3, respectively, or read-only medium 220. The preceding description of volumes 200A and 210A are the state of these volumes at a given point in time on original storage system 105B.

Figure 3:
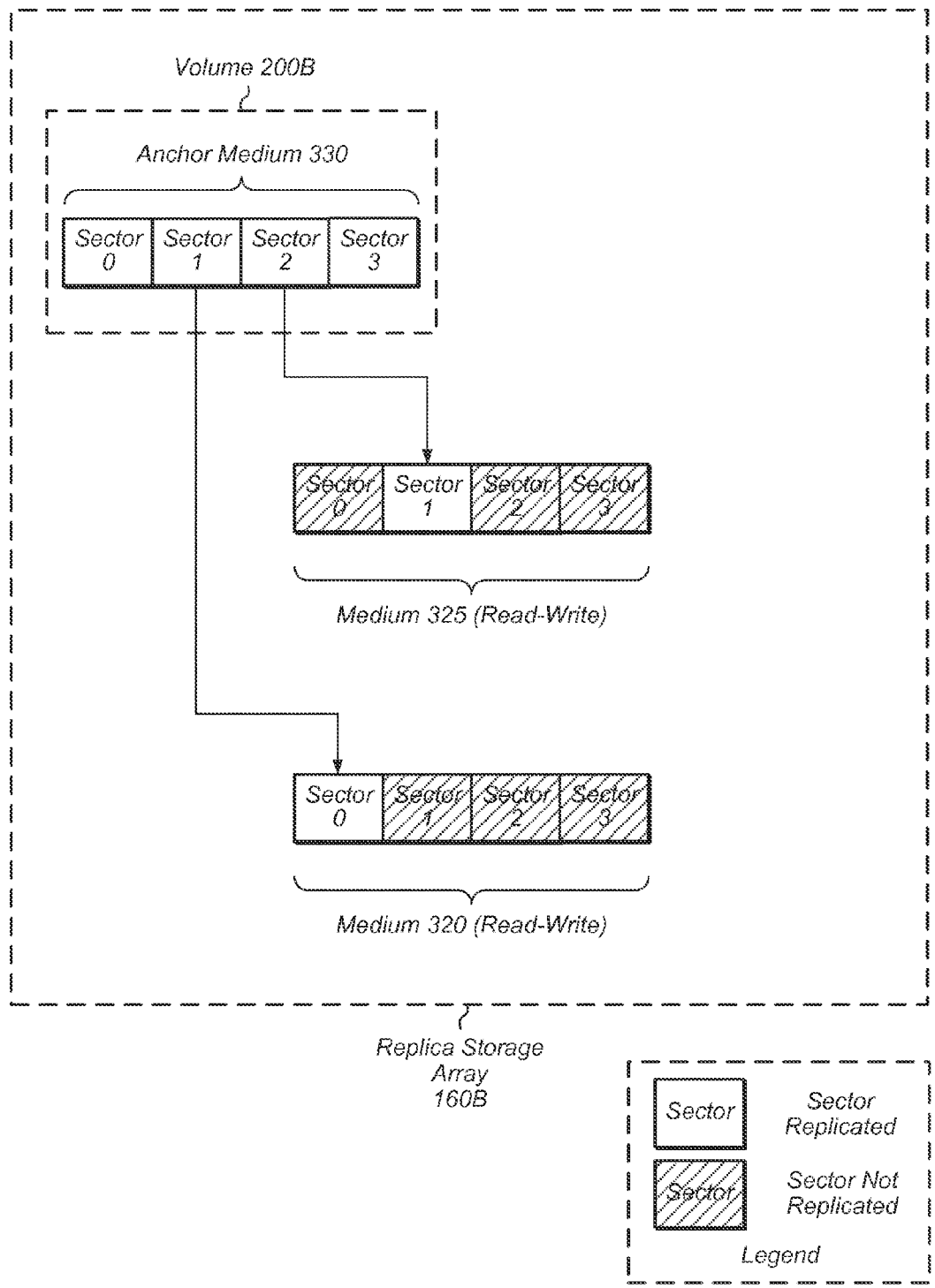
FIG. 3 is a block diagram of one embodiment of replicated volume on a replica storage array.

Referring now to FIG. 3, a block diagram of one embodiment of a replicated volume on a replica storage array is shown. It may be assumed for the purposes of this discussion that a request to replicate volume 200A (of FIG. 2) from original storage array 105B to the replica storage system 160B was generated. Volume 200B is intended to represent the replicated version of volume 200A and replica storage array 160B is intended to represent replica storage array 160A (of FIG. 1) at a later point in time. Replica storage system 160B may also store other volumes and mediums which are not shown to avoid obscuring the figure. In one embodiment, volume 200B may be exposed to user operations as soon as all of the portions of underlying mediums that underlie volume 200B have been replicated to replica storage array 160B. Therefore, even if one or more portions of these underlying mediums have not yet been replicated to replica storage array 160B, volume 200B may be exposed to user operations despite one or more of its underlying mediums being only partially filled.

It may be assumed that rather than replicating all of mediums 220 and 225 (of FIG. 2), only those sectors of mediums 220 and 225 which are included within volume 210A may be replicated to replica storage array 160B, which helps speed up the availability of volume 210B on replica storage array 160B. The sectors of mediums 320 and 325 which have been replicated are shown as blocks without diagonal lines while the sectors of mediums 320 and 325 which have not been replicated are shown as blocks with diagonal lines, as indicated by the legend at the bottom right of FIG. 3.

Accordingly, only sector 1 of medium 325 has been replicated to replica storage array 160B since this is the only sector of medium 325 that underlies volume 200B. A sector of a medium may be referred to as "underlying" a volume if the sector of the medium is included within the volume. In other words, a given sector of a medium may "underlie" a volume if the anchor medium of the volume maps to the given sector.

As shown in FIG. 3, only sector 0 of medium 320 has been replicated, and sectors 1-3 have not yet been replicated at the illustrated point in time. Both of mediums 320 and 325 may be put in an intermediate read-write state since there are sectors which have not yet been replicated within these mediums. These other sectors may be transferred at a later point in time, such as for example, when a request to replicate volume 210A (of FIG. 2) is generated. Alternatively, these other sectors may never be replicated to replica storage array 160B.

It may be assumed for the purposes of this discussion that sectors 0 and 3 of anchor medium 330 have also been replicated at the point in time shown in FIG. 3. Therefore, all of the data and mappings associated with volume 200B have been replicated, and volume 200B may be exposed to user operations even though volume 200B maps to and relies on underlying read-write mediums. Mediums 320 and 325 may be in a read-write state from the storage array perspective but in a read-only state from the perspective of user initiated operations.

Figure 4:
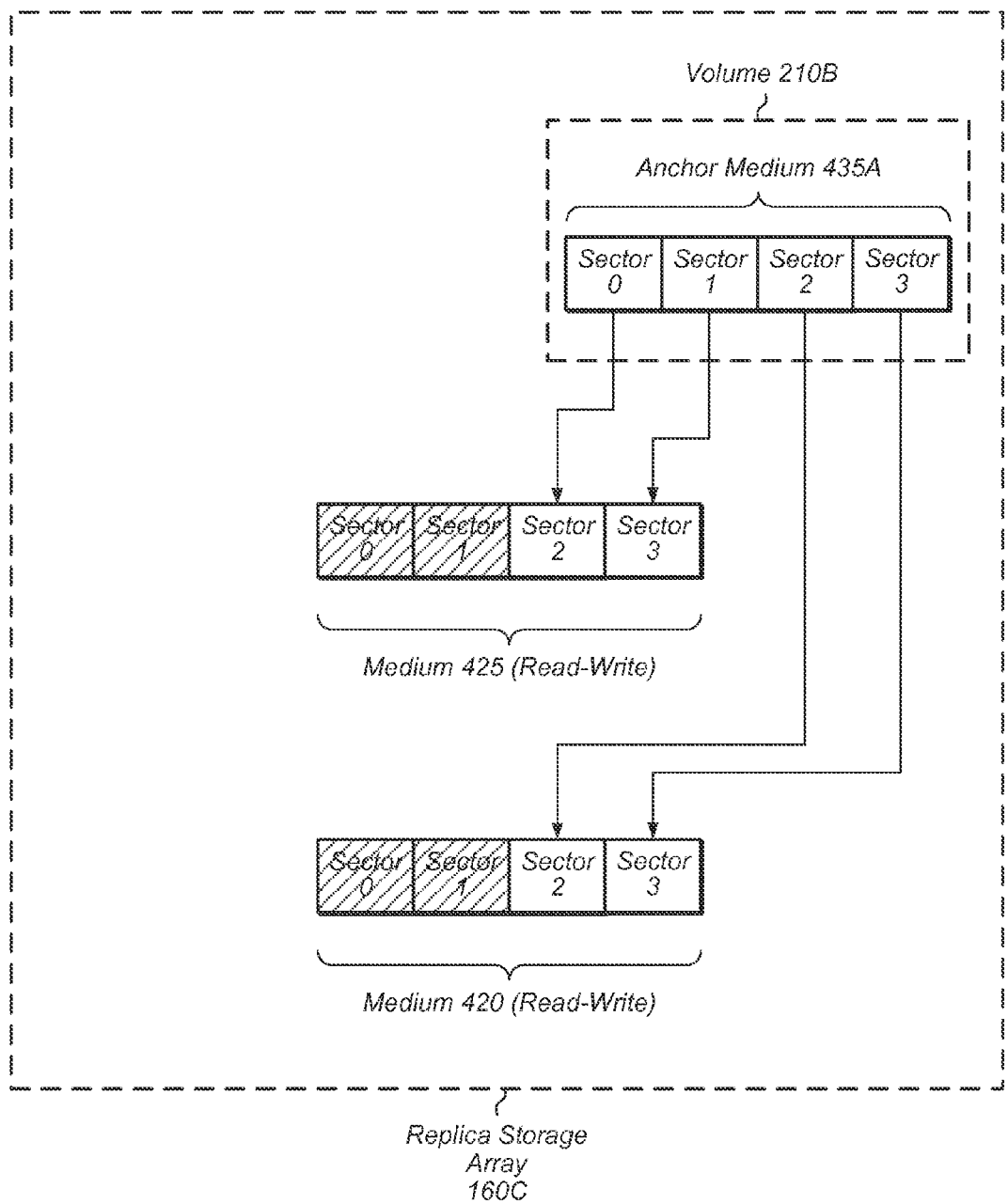
FIG. 4 is a block diagram of another embodiment of replicated volume on a replica storage array.

Turning now to FIG. 4, a block diagram of another embodiment of a replicated volume on a replica storage array is shown. It may be assumed for the purposes of this discussion that a request to replicate volume 210A (of FIG. 2) from original storage array 105B to the replica storage array 160C was generated. Volume 210B is intended to represent the replicated version of volume 210A and replica storage array 160C is intended to represent replica storage 160A (of FIG. 1) at a later point in time. Volume 210B includes anchor medium 435A, which is in a read-write state and which maps to the underlying mediums which include data for volume 210B. It is noted that replica storage array 160C may also store other volumes and mediums which are not shown to avoid obscuring the figure.

Similar to the replication example shown in FIG. 3, only those sectors of underlying mediums which are included within volume 210B may be replicated to replica storage array 160C. Therefore, sectors 2 and 3 of medium 225 (of FIG. 2) may be replicated to sectors 2 and 3, respectively, of medium 425 while sectors 0 and 1 of medium 425 remain unfilled. Also, sectors 2 and 3 of medium 220 (of FIG. 2) may be replicated to sectors 2 and 3, respectively, of medium 420 while sectors 0 and 1 of medium 420 remain unfilled. Although not shown in FIG. 4, at a later point in time, the remaining sectors of mediums 420 and 425 may be filled in and then these mediums may transition to the read-only state.

In one embodiment, the links shown in FIG. 4 between anchor medium 415A and medium 420 may be maintained and stored by a storage controller (e.g., storage controller 110 of FIG. 1) in corresponding entries of a medium mapping table. Similarly, the link between volume 210B and anchor medium 435A may be stored in a volume to medium mapping table. The storage controller of replica storage array 160C may utilize the volume to medium mapping table and the medium mapping table to determine how to access data of volume 210B to process any operations targeting volume 210B. In other embodiments, the links shown in FIG. 4 between anchor medium 435A and medium 420 may be maintained and stored using any other suitable mechanism.

Figure 5:
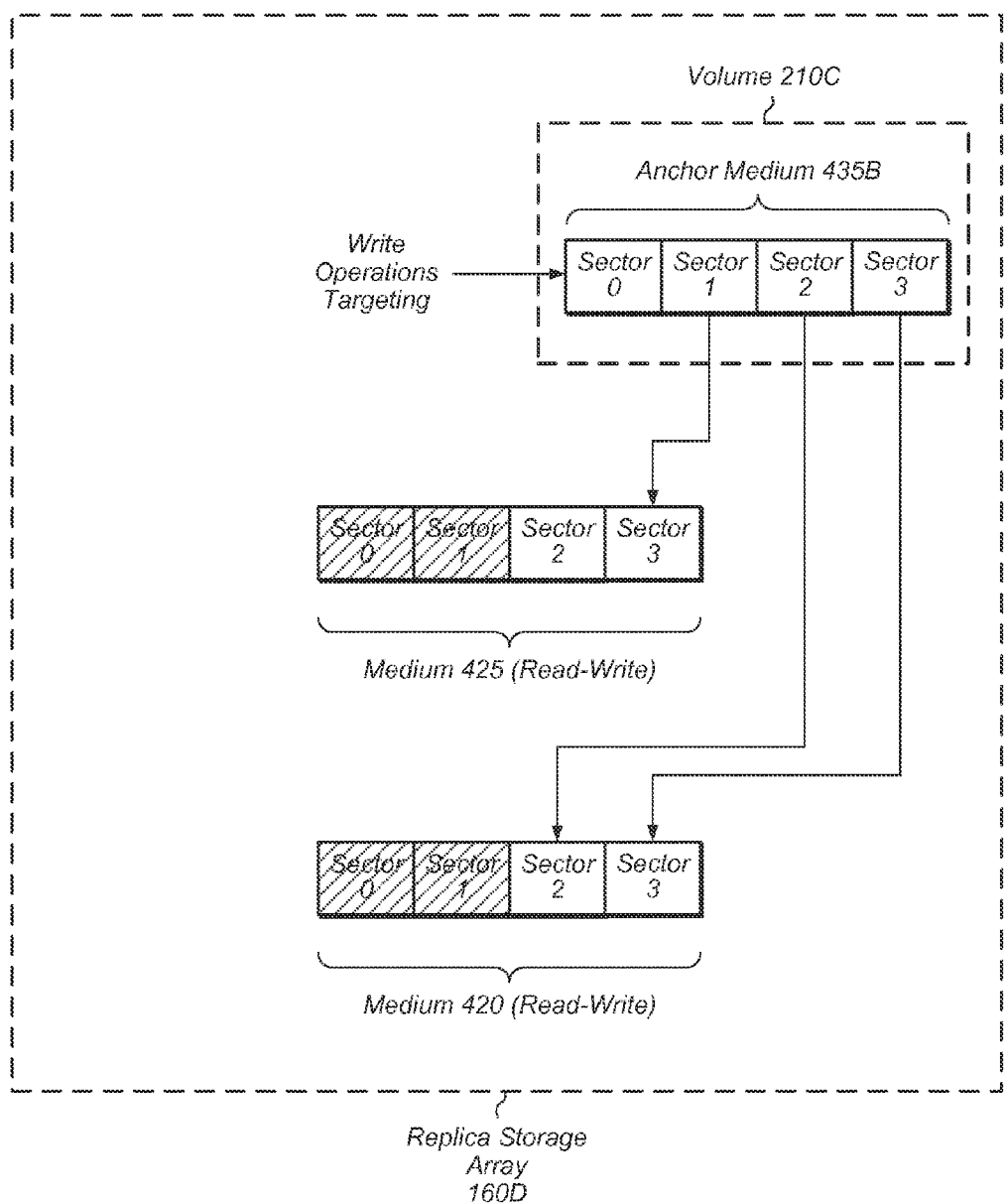
FIG. 5 is a block diagram of one embodiment of performing write operations to a volume with underlying read-write mediums.

Referring now to FIG. 5, a block diagram of one embodiment of performing write operations to a volume with underlying read-write mediums is shown. One or more write operations may be performed to volume 210C of replica storage array 160D while the underlying mediums of volume 210C are in an intermediate read-write state. In the example shown in FIG. 5, it may be assumed that write operations targeting sector 0 of volume 210C have been performed, which is indicated with the arrow pointing to sector 0 of anchor medium 435B of volume 210C. Volume 210C, anchor medium 435B, and replica storage array 160D are intended to represent volume 210B, anchor medium 435A, and replica storage array 160C (of FIG. 4), respectively, at a later point in time.

When the write operation(s) targeting and overwriting sector 0 of volume 210C are performed, new mappings may be generated for sector 0 and these mappings may be associated with sector 0 of anchor medium 435B. This may cause the previous link from sector 0 of anchor medium to sector 2 of medium 425 (as shown in FIG. 4) to be superseded by these new mappings, with the result that sector 2 of medium 425 will no longer underlie sector 0 of anchor medium 435B. Accordingly after these write operations are performed, there may be mappings associated with sector 0 of anchor medium 435B, sector 1 of anchor medium 435C may point to sector 3 of medium 425, sector 2 of anchor medium 435C may point to sector 2 of medium 420, and sector 3 of anchor medium 435C may point to sector 3 of medium 420. It is noted that other operations, such as read operations, may also be performed to volume 210C while one or more of the underlying mediums are in an intermediate read-write state.

Figure 6:
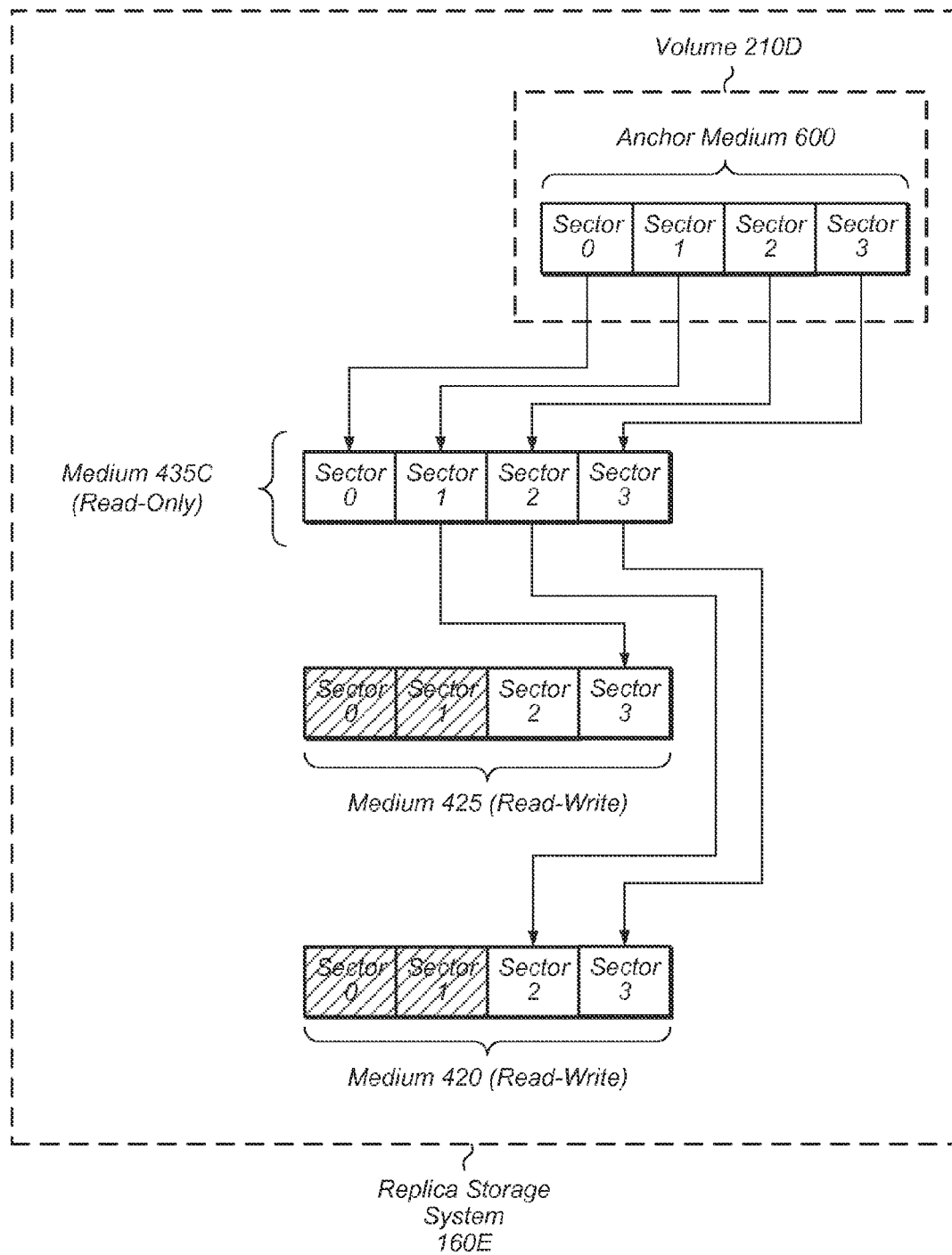
FIG. 6 is a block diagram of one embodiment of performing a snapshot of a volume with underlying read-write mediums.

Turning now to FIG. 6, a block diagram of one embodiment of performing a snapshot of a volume with underlying read-write mediums is shown. It may be assumed for the purposes of this discussion that a snapshot was taken of volume 210C (of FIG. 5). Volume 210D is intended to represent volume 210C after the snapshot was taken. In response to the snapshot 435C being taken, a new anchor medium 600 may be created and may underlie volume 210D. This anchor medium 600 may be initiated in a masked state with no local mappings, and anchor medium 600 may be linked to read-only medium 435C. When the snapshot is taken of volume 210C, anchor medium 435B may be converted into medium 435C and put into a read-only state. The mappings of medium 435C may then have the same underlying mappings of anchor medium 435B.

For example, there may be local mappings associated with sector 0 of medium 435C, sector 1 of medium 435C may reference sector 3 of medium 425, sector 2 of medium 435C may reference sector 2 of medium 420, and sector 3 of medium 435C may reference sector 3 of medium 420. The contents of volume 210D are the same as the contents of volume 210C, but the underlying mappings have been changed so that the new anchor medium 600 points to medium 435C. It is noted the read-write mediums 420 and 425 may remain in the read-write state after the snapshot of volume 210C is taken.

This snapshot is one example of an operation that may be performed on a volume with underlying read-write mediums. It is noted that any of various other user operations targeting volume 210D may be performed while volume 210D points to underlying read-write mediums (via its anchor medium 600). For example, read operations, write operations, and other operations may be performed to volume 210C while it references underlying read-write mediums.

Figure 7:
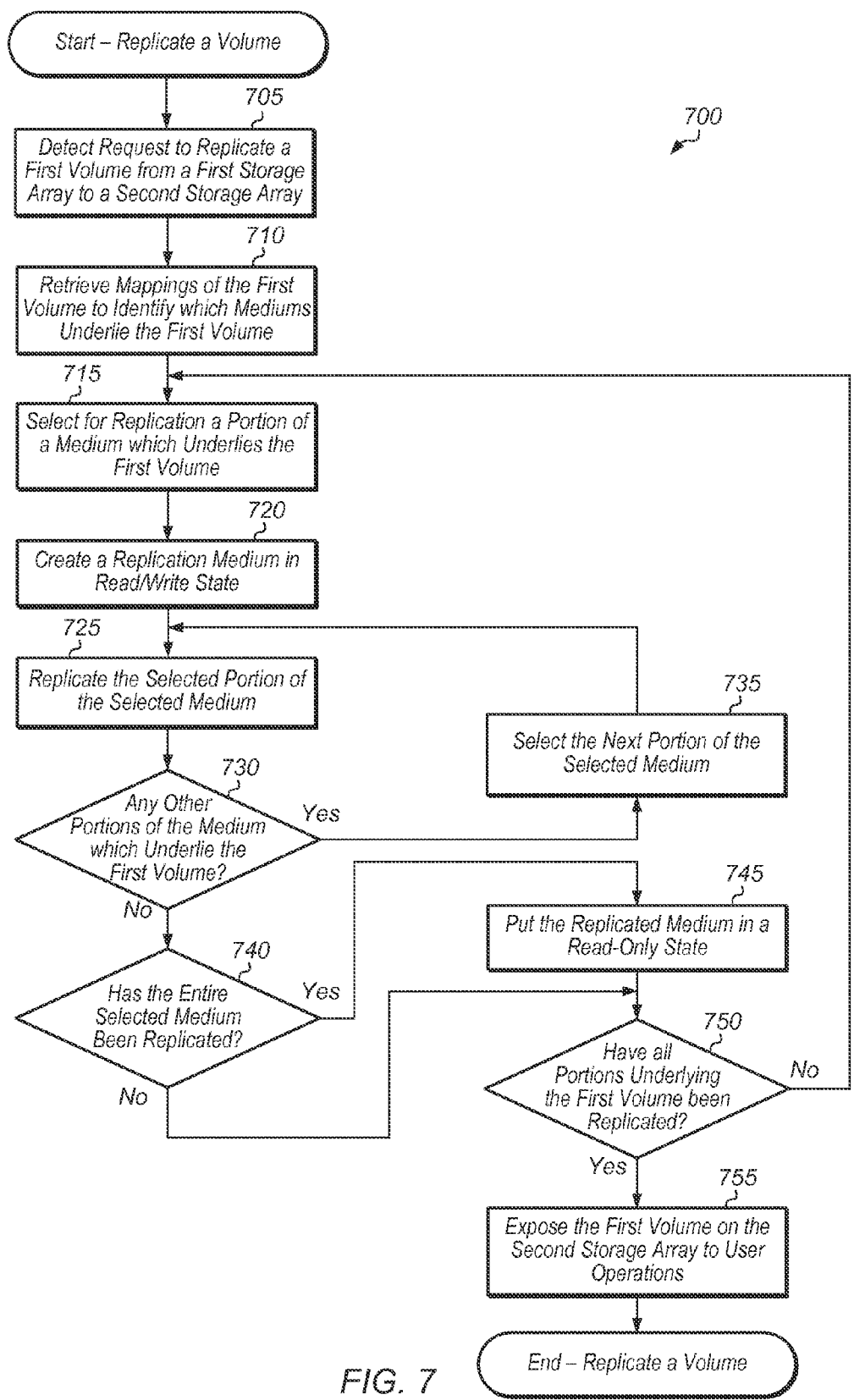
FIG. 7 is a generalized flow diagram illustrating one embodiment of a method for replicating a volume.

Turning now to FIG. 7, one embodiment of a method 700 for replicating a volume is shown. The components embodied in system 100 described above (e.g., storage controller 110) may generally operate in accordance with method 700. In addition, the steps in this embodiment are shown in sequential order. However, some steps may occur in a different order than shown, some steps may be performed concurrently, some steps may be combined with other steps, and some steps may be absent in another embodiment.

A request to replicate a first volume from a first storage array to a second storage array may be detected (block 705). In one embodiment, the first storage array may decide to replicate the first volume to the second storage array. Alternatively, in another embodiment, the second storage array may request for the first volume to be replicated. It should be understood that in other embodiments, other types of data (e.g., files, snapshots, mediums, virtual machines) may be replicated other than a first volume.

In response to detecting the request to replicate the first volume, the mappings of the first volume to underlying mediums may be retrieved to identify which mediums underlie the first volume (block 710). In one embodiment, the mappings of the first volume may be determined from corresponding entries in a volume mapping table and a medium mapping table. Next, the storage controller of the first storage array may select for replication a portion of a medium which underlies the first volume (block 715). Then, a replication medium may be created on the second storage array and put in a read-write state (block 720).

Next, the selected portion of the selected medium which underlies the first volume may be replicated to the second storage array (block 725). Then, it may be determined if there are any other portions of the selected medium which underlie the first volume and have not yet been replicated to the second storage array (conditional block 730). If there are any other portions of the selected medium which underlie the first volume and have not yet been replicated to the second storage array (conditional block 730, "yes" leg), then the storage controller of the first storage array may select the next portion of the selected medium (block 735). After block 735, method 700 may return to block 725 to replicate the selected portion of the selected medium. If there are no other portions of the selected medium which underlie the first volume and have not yet been replicated to the second storage array (conditional block 730, "no" leg), then the storage controller may determine if the selected medium has been replicated in its entirety to the second storage array (conditional block 740).

If the selected medium has been replicated in its entirety to the second storage array (conditional block 740, "yes" leg), then the replicated medium may be put into a read-only state on the second storage array (block 745). After block 745, the storage controller may determine if all medium portions which underlie the first volume have been replicated to the second storage array (conditional block 750). If the selected medium has not been replicated in its entirety to the second storage array (conditional block 740, "no" leg), then the storage controller may determine if all medium portions which underlie the first volume have been replicated to the second storage array (conditional block 750). In some embodiments, a timer may be started for the replicated medium and the replicated medium may be put into a read-only state if the replicated medium remains unmodified for a certain period of time.

If not all medium portions which underlie the first volume have been replicated to the second storage array (conditional block 750, "no" leg), then method 700 may return to block 715 to select a next medium portion for replication. If all medium portions which underlie the first volume have been replicated to the second storage array (conditional block 750, "yes" leg), then the first volume may be exposed to user operations on the second storage array (block 755). It is noted that the first volume may be exposed to user operations on the second storage array while one or more of its underlying mediums are in a read-write state with one or more its portions unfilled. It is also noted that while the first volume is exposed to user operations, the one or more of its underlying mediums that are in a read-write state may be written to by the second storage array. After block 755, method 700 may end.

It is noted that the above-described embodiments may comprise software. In such an embodiment, the program instructions that implement the methods and/or mechanisms may be conveyed or stored on a non-transitory computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system comprising:
    a first storage system comprising a storage controller and one or more storage devices; and
    a second storage system comprising a storage controller and one or more storage devices;
    wherein the first storage system is configured to:
    receive a first portion of a medium from the second storage system during replication of first data, wherein the first data is a volume, wherein the first portion of the medium underlies the first data, and wherein a second portion of the medium does not underlie the first data;
    expose the first data to one or more user operations while the medium is in an intermediate read-write state responsive to receiving the first data in its entirety and prior to receiving the second portion of the medium;
    take a snapshot of the volume while the medium is in the intermediate read-write state, wherein the medium remains in the intermediate read-write state after the snapshot is taken of the volume;
    create a new anchor medium for the volume responsive to taking the snapshot of the volume;
    map the new anchor medium to a previous anchor medium of the volume responsive to taking the snapshot of the volume; and
    convert the previous anchor medium to a read-only state responsive to taking the snapshot of the volume.

2. The system as recited in claim 1, wherein the volume includes one or more other portions of one or more other mediums, and wherein the first storage system is configured to wait until the one or more other portions of the one or more other mediums are replicated prior to exposing the volume to one or more user operations.

3. The system as recited in claim 2, wherein responsive to taking the snapshot of the volume, the first storage system is further configured to:
    store a link between the volume and the new anchor medium in a volume to medium mapping table;
    store a link between the new anchor medium and the previous anchor medium in a medium mapping table; and
    store a link between the previous anchor medium and the first portion of the medium in the medium mapping table.

4. The system as recited in claim 3, wherein the intermediate read-write state indicates that the medium is in a read-write state from a perspective of the first storage system, and the intermediate read-write state also indicates that the medium is in a read-only state from a perspective of the one or more user operations.

5. The system as recited in claim 1, wherein the first data is mapped to an anchor medium, wherein a first portion of the anchor medium is mapped to the first portion of the medium, and wherein the first storage system is configured to:
    perform a write operation to the first data while the medium is in the intermediate read-write state; and
    generate new mappings for the anchor medium responsive to performing the write operation to the first data.

6. The system as recited in claim 1, wherein the first data is mapped to an anchor medium, wherein a first portion of the anchor medium is mapped to the first portion of the medium, and wherein the first storage system is configured to write to other portions of the medium while the first data is exposed to one or more user operations.

7. A method comprising:
    receiving a first portion of a medium at a first storage system from a second storage system during replication of first data, wherein the first data is a volume, wherein the first portion of the medium underlies the first data, and wherein a second portion of the medium does not underlie the first data;
    exposing the first data to one or more user operations while the medium is in an intermediate read-write state responsive to receiving the first data in its entirety and prior to receiving the second portion of the medium;
    taking a snapshot of the volume while the medium is in the intermediate read-write state, wherein the medium remains in the intermediate read-write state after the snapshot is taken of the volume;
    creating a new anchor medium for the volume responsive to taking the snapshot of the volume;
    mapping the new anchor medium to a previous anchor medium of the volume responsive to taking the snapshot of the volume; and
    converting the previous anchor medium to a read-only state responsive to taking the snapshot of the volume.

8. The method as recited in claim 7, wherein the volume includes one or more other portions of one or more other mediums, wherein the method further comprising waiting until the one or more other portions of the one or more other mediums are replicated prior to exposing the volume to one or more user operations.

9. The method as recited in claim 8, wherein responsive to taking the snapshot of the volume, the method further comprising:
    storing a link between the volume and the new anchor medium in a volume to medium mapping table;

storing a link between the new anchor medium and the previous anchor medium in a medium mapping table; and storing a link between the previous anchor medium and the first portion of the medium in the medium mapping table.

10. The method as recited in claim 9, wherein the intermediate read-write state indicates that the medium is in a read-write state from a perspective of the first storage system, and the intermediate read-write state also indicates that the medium is in a read-only state from a perspective of the one or more user operations.

11. The method as recited in claim 7, wherein the first data is mapped to an anchor medium, wherein a first portion of the anchor medium is mapped to the first portion of the medium, and wherein the method further comprising:

performing a write operation to the first data while the medium is in the intermediate read-write state; and generating new mappings for the anchor medium responsive to performing the write operation to the first data.

12. The method as recited in claim 7, wherein the first data is mapped to an anchor medium, wherein a first portion of the anchor medium is mapped to the first portion of the medium, wherein the method further comprising writing to other portions of the medium while the first data is exposed to one or more user operations.

13. A non-transitory computer readable storage medium storing program instructions, wherein the program instructions are executable by a processor to:

receive a first portion of a medium from the second storage system during replication of first data, wherein the first data is a volume, wherein the first portion of the medium underlies the first data, and wherein a second portion of the medium does not underlie the first data;

expose the first data to one or more user operations while the medium is in an intermediate read-write state responsive to receiving the first data in its entirety and prior to receiving the second portion of the medium;

take a snapshot of the volume while the medium is in the intermediate read-write state, wherein the medium remains in the intermediate read-write state after the snapshot is taken of the volume;

create a new anchor medium for the volume responsive to takin~ the snapshot of the volume;

map the new anchor medium to a previous anchor medium of the volume responsive to taking the snapshot of the volume; and convert the previous anchor medium to a read-only state responsive to taking the snapshot of the volume.

14. The non-transitory computer readable storage medium as recited in claim 13, wherein the volume includes one or more other portions of one or more other mediums, and wherein the program instructions are further executable by a processor to wait until the one or more other portions of the one or more other mediums are replicated prior to exposing the volume to one or more user operations.

15. The non-transitory computer readable storage medium as recited in claim 14, wherein responsive to taking the snapshot of the volume, the program instructions are further executable by a processor to:

store a link between the volume and the new anchor medium in a volume to medium mapping table;

store a link between the new anchor medium and the previous anchor medium in a medium mapping table; and store a link between the previous anchor medium and the first portion of the medium in the medium mapping table.

16. The non-transitory computer readable storage medium as recited in claim 15, wherein the intermediate read-write state indicates that the medium is in a read-write state from a perspective of the first storage system, and the intermediate read-write state also indicates that the medium is in a read-only state from a perspective of the one or more user operations.

17. The non-transitory computer readable storage medium as recited in claim 13, wherein the first data is mapped to an anchor medium, wherein a first portion of the anchor medium is mapped to the first portion of the medium, and wherein the program instructions are further executable by a processor to:

perform a write operation to the first data while the medium is in the intermediate read-write state; and generate new mappings for the anchor medium responsive to performing the write operation to the first data.

\* \* \* \* \*